United States Patent
Korobov et al.

(10) Patent No.: US 12,341,843 B1
(45) Date of Patent: *Jun. 24, 2025

(54) METHOD TO DETERMINE USE OF LOCAL AND REMOTE APPLICATIONS IN A DISTRIBUTED MULTIUSER ENVIRONMENT FOR SHARED FILE RESOURCES

(71) Applicant: PARALLELS INTERNATIONAL GMBH, Schaffhausen (CH)

(72) Inventors: Ivan Korobov, Moscow (RU); Silvan Chetcuti, Sliema (MT); Ruslan Sadovnikov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,210

(22) Filed: Dec. 6, 2023

Related U.S. Application Data

(63) Continuation of application No. 17/855,256, filed on Jun. 30, 2022, now Pat. No. 11,848,979, which is a
(Continued)

(51) Int. Cl.
*H04L 67/025* (2022.01)
*G06F 16/178* (2019.01)
*H04L 67/12* (2022.01)

(52) U.S. Cl.
CPC ........ *H04L 67/025* (2013.01); *G06F 16/1787* (2019.01); *H04L 67/12* (2013.01)

(58) Field of Classification Search
CPC .... H04L 67/025; H04L 67/12; G06F 16/1787
See application file for complete search history.

(56) References Cited

U.S. PATENT DOCUMENTS

| 2009/0044146 A1 | 2/2009 | Patel et al. |
| 2012/0297311 A1 | 11/2012 | Duggal |

(Continued)

OTHER PUBLICATIONS

Parallels, "Parallels Remote Application Server Administrator's guide 17.1", https://download.parallels.com/ras/v17/docs/en_US/Parallels-RAS-v17-Administrators-Guide.pdf, 1999-2020, 416 pages.

(Continued)

*Primary Examiner* — Cheikh T Ndiaye
(74) *Attorney, Agent, or Firm* — Rosenberg, Klein & Lee

(57) ABSTRACT

The subject matter of this specification can be implemented in, among other things, a method that includes determining, by a first computing device, a set of remote applications hosted by a second computing device including file type associations for each remote application. The first computing device determines a set of local applications and their file type associations. The each file type associated with a remote application, the first computing device determines whether the file type is also associated with a local application. Responsive to determining that the file type is associated with both a remote and local application, the first computing device configures a proxy component with parameters specifying the remote application and the local application. The proxy component is configured to determine whether to open a requested file of the file type with the remote application or the local application based upon the current client/server environment.

13 Claims, 7 Drawing Sheets

Related U.S. Application Data continuation of application No. 17/149,100, filed on Jan. 14, 2021, now Pat. No. 11,381,631, which is a continuation of application No. 16/024,110, filed on Jun. 29, 2018, now Pat. No. 10,924,528.

(56) References Cited

U.S. PATENT DOCUMENTS

| | | |
|---|---|---|
| 2013/0111336 A1* | 5/2013 | Dorman ................ G06F 9/4843 715/255 |
| 2015/0169616 A1 | 6/2015 | Benraz |
| 2015/0365469 A1* | 12/2015 | Procopio ................ H04L 67/10 709/217 |
| 2016/0127447 A1 | 5/2016 | Jiang et al. |
| 2017/0026452 A1* | 1/2017 | Duggal .............. G06Q 30/0269 |
| 2018/0165447 A1* | 6/2018 | Soman ................ G06F 9/45508 |

OTHER PUBLICATIONS

Parallels, "Parallels Remote Application Server Solutions guide 17.1", https://download.parallels.com/ras/v17/docs/en_US/Parallels-RAS-v17-Solutions-Guide.pdf, 1999-2020, 66 pages.

* cited by examiner

# METHOD TO DETERMINE USE OF LOCAL AND REMOTE APPLICATIONS IN A DISTRIBUTED MULTIUSER ENVIRONMENT FOR SHARED FILE RESOURCES

RELATED APPLICATIONS

This application claims the benefit as a continuation of U.S. patent application Ser. No. 17/855,256 filed Jun. 30, 2022; which itself claims the benefit of priority as a continuation of U.S. patent application Ser. No. 17/149,100 filed Jan. 14, 2021 which has issued as U.S. Pat. No. 11,381,631; which itself claims the benefit of priority as a continuation of U.S. patent application Ser. No. 16/024,110 filed Jun. 29, 2018 which has issued as U.S. Pat. No. 10,924,528; the entire contents of each being incorporated herein by reference.

TECHNICAL FIELD

This disclosure generally relates to running applications from a client device or a remote device based upon performance metrics evaluating network connectivity between the client device and the remote device. More specifically, the disclosure relates to determining whether to launch a remote application or local application for a file based upon performance metrics associated with the remotely hosted application and the locally hosted application.

BACKGROUND

In a network environment it is often advantageous for a user of a computing device to execute applications on a remote server rather than on the local device. Multiple client devices (clients) can have access to the remote server and applications installed on that server. This eliminates the need to install and upkeep separate applications on client devices, decreases administration demands and costs, and promotes uniformity of user experiences and interchangeability of client devices. Such server-based computing allows utilizing remote server's computing power and memory capabilities, which often significantly exceed resources available on client terminal devices. Often, a client device is a "lean" (or "thin") machine which itself performs little computing, or storage of data, with only keyboard, mouse, and graphical interface data exchanges between the lean client and the remote server device with the bulk of computing, data processing, and data storage taking place on the remote server. The applications executed on the remote server are being controlled by the client device via, for example, a remote desktop virtualization session.

The client device and the remote server may provide a certain level of data sharing and integration such that files stored on the client device may be accessible by applications running on the remote server. Additionally, files located on the remote server may be mounted on the client device so that the remote files may be opened by applications running locally on the client device. The client device operating system shell may allow certain remote applications to be associated with files located on the client device.

DETAILED DESCRIPTION

Figure 1:
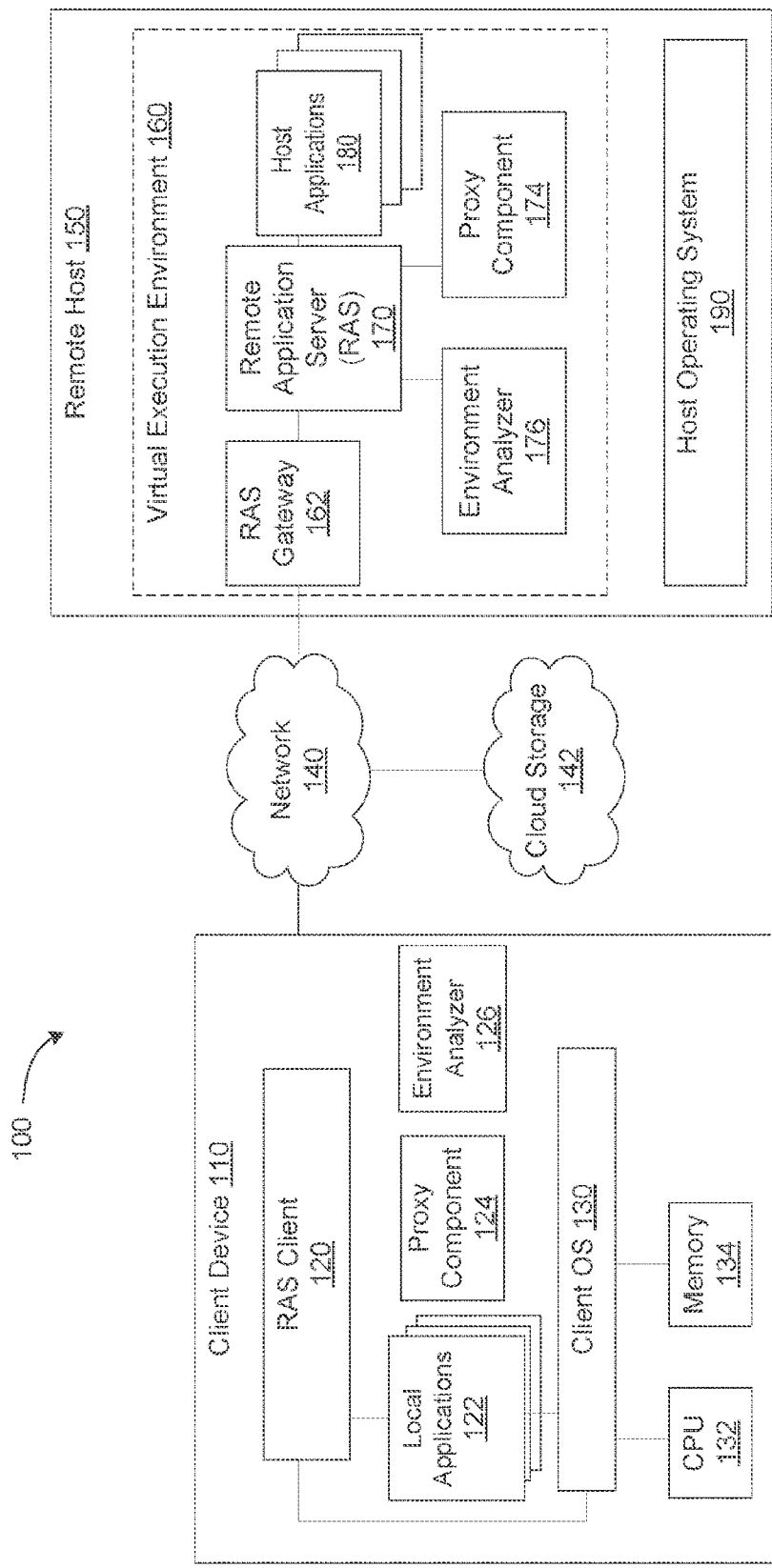
FIG. 1 depicts a high-level component diagram of a network architecture in which the methods and systems described herein may be implemented.

In a network environment it is often advantageous for a user of a computing device to open files using applications on a remote server rather than on the local device. An operating system on the local device may be configured to redirect file type associations from a local application hosted on the local device to a remote application hosted by the remote server. As a result, if a user of the local device opens a file with a file type associated with a remote application in a standard file browser, such as Windows Explorer® or Finder®, the operating system of the local device may redirect the file request to the remote application. However, file type redirects, once configured, remain static regardless of the client/server environment. For example, if a file type has been configured to open within a remote application but network connectivity between the local device and the remote server is poor or non-existent, then the user experience with the remote application may not be satisfactory due to poor network connectivity or the file may fail to open in the remote application if there is no network connectivity.

The operating system on the local device may be reconfigured manually to use a local application capable of opening the desired file. However, if network connectivity to the remote server is restored, then the user may have to manually reconfigure the file type to open using the remote application again. As a result, static file type redirects require manual reconfiguration to account for changing network availability. Such reconfigurations may become cumbersome and inconvenient to users.

Aspects of the present disclosure address the above and other deficiencies by having a proxy component configured on the local device to determine whether to launch a remote application hosted on the remote server for opening the requested file or to launch a local application hosted on the local device for opening the requested file. In particular, the decision on whether to open the file using the remote application or the local application may be based upon application performance metrics for the remote application and/or the local application. The application performance metrics may evaluate network connectivity between the local device and the remote server, network speed and latency, and proximity of the requested file. For example, if the user of the local device made a request to open a file located on the local device, the proxy component may receive the file request and determine whether to open the file using either a remote application hosted on the remote server or a local application hosted on the local device. The proxy component may determine that the network connectivity and network speed between the local device and the remote server is sufficient and automatically (without any user interaction) redirect the file request to the remote application hosted on the remote server. Alternatively, if the proxy component determines that the network connectivity and network speed between the local device and the remote server is poor then the proxy component may automatically redirect the file request to the local application hosted on the local device. As a result, the proxy component may dynamically determine which application will provide the user with the most efficient user experience for the file request based upon current network conditions.

The client device may be a personal computer, a laptop, a desktop, a tablet, a mobile device, or another server. The client device can be an endpoint or a terminal device. The remote server may be a single computing device, or it may comprise multiple devices, or be a part of a cloud computing group. The client device may be connected to the remote server via a local area network (LAN), Internet, or a telecommunications network. The client device may be connected to the remote server via multiple networks. For example a client mobile device can be connected to an intermediary (a server, a desktop computer, etc.) via a telecommunications network whereas the intermediary may be connected to the remote server via LAN or Internet.

A client-server virtual execution environment can have a variety of possible implementations. In one example, a virtual execution environment may be implemented by a remote personal computer (PC) agent running on a personal computer system. In another example, client-server computing model may utilize a virtual desktop infrastructure (VDI). Available VDI platforms may include Citrix®, VMWare®, Dell-Quest, LISTEQ, Hyper-V®, Virtual Box, or any other similar systems. Virtual desktop images can be persistent (static) or non-persistent (dynamic). A virtual desktop image may be produced by the remote server with only input-output data transferred to/from the client device. A VDI may utilize a hypervisor or a virtual machine monitor (VMM) interacting with the remote server's hardware (CPUs, memory, various other devices) directly or via the host operating system. The hypervisor or VMM may manage virtual guest operating systems accessible by the clients. Clients can then run applications on those guest operating systems as if they were local to the client.

In another illustrative example, client-server environment may be facilitated via Remote Desktop Services (RDS), Terminal Services, or similar resources. RDS may allocate on the remote server a separate guest operating system to each user connected to the server. The remote server may provide support for the client-server environment by a remote application server, such as Parallels® Remote Application Server (RAS). RAS facilitates connections of client devices with various applications that are running on the remote server. The remote application server may additionally provide client authentication, load balancing, and/or other features related to brokering the client connections to the virtual execution environments. Each client device that connects to the RAS on the remote server may implement a RAS client application. The RAS client may represent a client application running on the client device employed to establish a remote connection to the RAS on the remote server. The client device may access and run remote applications via the RAS client.

Because various client-server virtual execution environments utilize hardware and software resources of the remote server, a situation may arise where the remote server is overloaded by multiple applications executed simultaneously by various users via respective client devices. Alternatively, the server might not be overloaded, but the number of the network users may be so high that the experience of the user running an application on the server would be inadequate. Network quality issues, such as excessive channel noise, may contribute to the same outcome. A threshold may be achieved where a user of a client device would be better off if the desired application were executed on the local client device as opposed to the remote server.

In an implementation, the RAS client may configure the proxy component to receive file requests for file types that may be opened by applications hosted on either the client device or the remote server. The RAS client may establish a remote session with the remote server and may retrieve a list of remote applications from the remote server. The list of remote applications may specify file type associations for each of the remote applications. The RAS client may communicate with the operating system on the client device in order to retrieve a list of local applications, including their associated file types. The RAS client may then determine files types that may be opened using either a remote application hosted by the remote server or a local application hosted by the client device. For these file types, the RAS client may configure the proxy component with application calls to both the associated remote application and the associated local application. The RAS client may then communicate with the client device operating system in order to associate the file type to the proxy component.

Configuring a proxy component is not limited to the RAS client. The RAS running on the remote server may also determine file types that are associated with remote applications hosted by the remote server and client applications hosted on the client device. The proxy component on the remote server may then be configured to receive file requests, within a remote session, and then determine whether to open the requested file using the remote application or the client application.

In some implementations, components running on either the client device or the remote server may determine application performance metrics for opening the requested file on both the local application and the remote application. The application performance metrics may incorporate network connectivity metrics related to network availability, network latency, availability of the remote server, and the location of the requested file. Proximity of the requested file to the local device and/or the remote server may dictate whether the requested file is opened with either the remote application or the local application. For example, if the requested file is located on the remote server, a different client device, or on remote storage, then the decision to use local application may factor in file transfer time to transfer contents of the file from the remote location to the local device that hosts the local application.

Accordingly, aspects of the present disclosure provide advantages of determining the maximum efficiency achievable in the client-server environment and executing the application under the most favorable conditions for the current state of that environment, in order to improve overall application performance. As a result, the system may benefit from the more efficient utilization of resources based on current system conditions, as opposed to the situation where applications are statically configured to execute on either the remote server or local device. A user may experience improvement in speed and increased quality of application execution.

FIG. 1 illustrates schematically an exemplary high-level component diagram of a network architecture in which the methods and systems described herein may be implemented. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity. Various other computer systems, software or hardware components, and/or methods of their interconnection, which are not shown in FIG. 1, may be compatible with the methods and systems described herein. The systems and methods described herein may be implemented by hardware (e.g., general purpose and/or specialized processing devices, and/or other devices and associated circuitry), software (e.g., instructions executable by a processing device), or a combination thereof. Various aspects of the above referenced disclosure are described in details below by way of examples, rather than by way of limitation.

Client-host computing system 100 may comprise one or more client devices 110, which may communicate over a network 140 with one or more remote hosts 150. The network 140 can be Internet, LAN, or a telecommunications network. The network can have access to cloud storage 142. Cloud storage may be located off-premises, and use third-party cloud storage services, or similar platforms. Alternatively, cloud storage 142 can be located on-premises. Cloud storage can be a part of one of the remote hosts 150 or one of the client devices 110. In the description below, the singular terms, such as "client device," "host," "server," "environment," etc. will be understood to also correspond to plural terms, whenever more than one device or component can possibly be used. The remote host 150 may include one or more central processing units (CPU), not explicitly shown on FIG. 1, also referred to as "processing devices," communicatively coupled to one or more memory devices and one or more peripheral devices via buses (not shown). "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The remote host 150 may implement a virtual execution environment 160, including but not limited to, Remote Desktop Services, virtual desktop infrastructures, containerization engines, or virtual execution environments provided by HTML5-enabled browsers. The virtual execution environment may include a remote application server 170. The remote application server 170 (RAS) may be connected to the network 140 via a secure RAS gateway 162. The remote application server 170 may communicate with a client authenticator service (not shown) which helps to establish the identity of a user of client device 110 and negotiate a client-host connection via the network 140. Upon establishing and negotiating connection with the client device 110, the client authenticator service may determine the level of access the particular user/client device combination may have to the remote application server 170.

Once the client authenticator service determines the access level, the remote application server 170 may provide the list of available host applications 180 and transmit the list to the client device 110 via the network 140. Host applications 180 refer to applications that may be launched on the remote host 150 using one or more processing units and/or memory devices of the remote host 150. The virtual execution environment 160 may allocate physical resources (CPUs, memory, etc.) and software (OS) resources to the launched application to execute it inside a virtual application container separate from other applications running concurrently on the remote host 150. Concurrent applications may include other applications running from the same client device 110, applications running from other remote client devices, or other applications executed locally on the remote host 150.

The client device 110 may include, but is not limited to, the RAS client 120, client applications 122, proxy component 124, environment analyzer 126, and client OS 130. The RAS client 120 may establish a remote connection with the remote application server 170 and provide user access, via a user interface, to a remote session hosted by the remote application server 170. For example, the RAS client 120 may receive the list of available remote applications 180 from the remote application server 170 and offer the remote applications to the user of the client device 110. The RAS client may present the available remote applications 180 as graphical representations, such as windows, pop-ups, icons, etc. The RAS client 120 may then allow the user of the client device 110 to launch one or more remote applications 180 within the virtual execution environment 160 as if the application were executed on the client device 110.

In some embodiments, RAS client 120 may be an HTML5-enabled browser. In such embodiments, the client-host system 100 may be configured to display remote applications 180 using one or more HTML pages which may be accessed by HTML5-enabled browsers running on the client devices. Thus, from the users' perspective, the remote applications 180 will be perceived as web-based applications, while in reality they are executed by the virtualized execution environment 160.

As described above, the RAS client 120 may receive a list of available remote applications 180 from the remote application server 170. Included with the list of available remote applications 180 are one or more files of one or more file types associated with each of the available remote applications 180. For example, if one of the remote applications 180 is Microsoft Word then associated file types may include word processor file types such as ".doc, .docx, .odt, .pdf, .rtf, .txt, .wks, and .wpd". The RAS client 120 may also be configured to communicate with the client operating system (OS) 130 to retrieve a set of client applications 122 that are hosted locally on the client device 110. For example, the RAS client 120 may use native application programming interfaces (APIs) for the OS shell of client OS 130 to request a list of client applications 122. For the purposes of this disclosure, local applications refer to applications hosted on the device making the application request. For example, queries or requests made by the RAS client 120, the proxy component 124, or the environment analyzer 176 for client applications 122 may refer to the client applications 122 as "local applications" as they are hosted by the same device, client device 110, as the service making the query or request. Upon receiving the list of client applications 122 and the list of available remote applications 180, the RAS client 120 may configure the proxy component 124 with calls to available local applications (client applications) and remote applications for specific file types.

The proxy component 124 may represent a proxy application configured to receive a request to open a file of a particular file type and then route the file request to either a local application or a remote application that supports the particular file type of the requested file. The proxy component 124 may determine whether to route the file request to either the local application or the remote application based upon an analysis of application performance conditions of the client device 110 and/or the remote host 150. Specifically, the proxy component 124 may communicate with the environment analyzer 126 to determine application performance values for using the client application 122 and the remote application 180.

In an implementation, the environment analyzer 126 is a service configured to dynamically monitor the network environment between the client device 110 and the remote host 150. The environment analyzer 126 may be a software component coupled to the network 140 and to the remote host 150. The environment analyzer 126 may collect data regarding network bandwidth, noise, and the quality of the network 140 between the client device 110 and the remote host 150. The environment analyzer 126 may then calculate a local application performance value and a remote application performance value. The local application performance value may indicate estimated performance efficiency for opening the requested filing using a local application hosted on the client device 110. The remote application performance value may indicate estimated performance efficiency for opening the requested filing using a remote application hosted on the remote host 150. Each of the local application performance value and the remote application performance value may be calculated using a variety of performance metrics including network connectivity between the client device 110 and the remote host 150, speed of data transfer between the client device 110 and the remote host 150, and bandwidth of network connection between client device 110, the remote host 150, and the location of the requested file. For example, if the requested file is located on another client device, then the environment analyzer 126 may take into account network bandwidth between the other client device and the client device 110 and between the other client device and the remote host 150.

In an implementation, the local application performance value and the remote application performance value may be based on performance markers for the client device 110 and the remote host 150. For example the local application performance value may factor in local performance markers, such as local CPU 132 speed, memory 134 clock speed and burst rate, bus speed, performance of the local client OS 130, and performance requirements of the client application 122. Similarly, the remote application performance value may be based on remote performance markers, such as remote host CPU speed, memory clock speed and burst rate, performance of the host OS 190, and current load of the virtual execution environment 160.

Additionally, the local application performance value and the remote application performance value may be based on processing overhead associated with the location of the requested file. Processing overhead associated with the requested file may include the time it takes to copy contents of the file from its current location to the location of either the client application 122 or the remote application 180. For example, if the request file is located on the client device 110, then the processing overhead required to copy the requested file to the remote host 150, such as speed of data transfer and size of the requested file, is incorporated into the remote application performance value calculation. Similarly, if the requested file is located on the remote host 150, then the processing overhead required to copy the requested file to the client device 110 is incorporated into the local application performance value calculation. Additionally, if the requested file is located somewhere else, such as on another client device or within cloud storage 142, then both the local application performance value and the remote application performance value would incorporate processing overhead for copying the requested file from the cloud storage 142 to either the client device 110 or the remote host 150. In an implementation, the environment analyzer 126 may be configured to calculate different performance value scenarios for the local application performance value and the remote application performance value, such as determining whether to synchronize ("sync") the requested file by either copying the entire file or by partially syncing the requested by based on chunks of the file that need synchronization.

Referring back to the RAS client 120, after the proxy component 124 has been configured for remote and local applications and their respective file types, the RAS client 120 may modify file type associations within the client OS 130. For example, the RAS client 120 may use client OS APIs to communicate with the OS shell of the client OS 130 to modify file type associations such that when a file is requested by a user of the client device 120, the client OS 130 launches the proxy component 124 instead of the local application originally associated with the file. The proxy component 124 may then determine, by initiating the environment analyzer 126, whether to route the file request to the client application 122 or the remote application 180 based upon a local application performance value and a remote application performance value calculated by the environment analyzer 126.

Referring to FIG. 1, the remote host 150 may also include a proxy component 174 and an environment analyzer 176. In an implementation, the remote application server 170 may be configured to receive a list of client applications 122 from the RAS client 120. For example, upon establishing a connection with the client device 110, the RAS client 120 may send a list of client applications 122, including file type associations for each of the client applications 122. The remote application server 170 may be configured to retrieve a set of remote applications 180 by using native APIs to request the set of remote applications 180 from the OS shell of the host OS 190. Upon receiving the list of client applications 122 and the list of remote applications 180, the remote applications server 170 may configure the proxy component 174 with calls to available remote and client applications for specific file types.

The proxy component 174 may be configured, similar to proxy component 124, to determine whether to route a file request to either the client application 122 on the client device 110 or to the remote application 180 on the remote host 150. The proxy component 174 may communicate with the environment analyzer 176 to determine performance values for using a client application 122 and for using a remote application 180. Similar to the environment analyzer 126, the environment analyzer 176 may dynamically monitor the network environment between the client device 110 and the remote host 150 and calculate a local application performance value and a remote application performance value.

In an implementation, upon configuring the proxy component 174, the remote application server 170 may modify file type associations within the virtual execution environment 160 such that if during a remote session the user of the client device 110 makes a request to open a file, within the remote session, the proxy component 174 receives the file request and determines whether it is more efficient to open the file using a remote application 180 on the remote host 150 or using a client application 122 on the client device 110.

Figure 2:
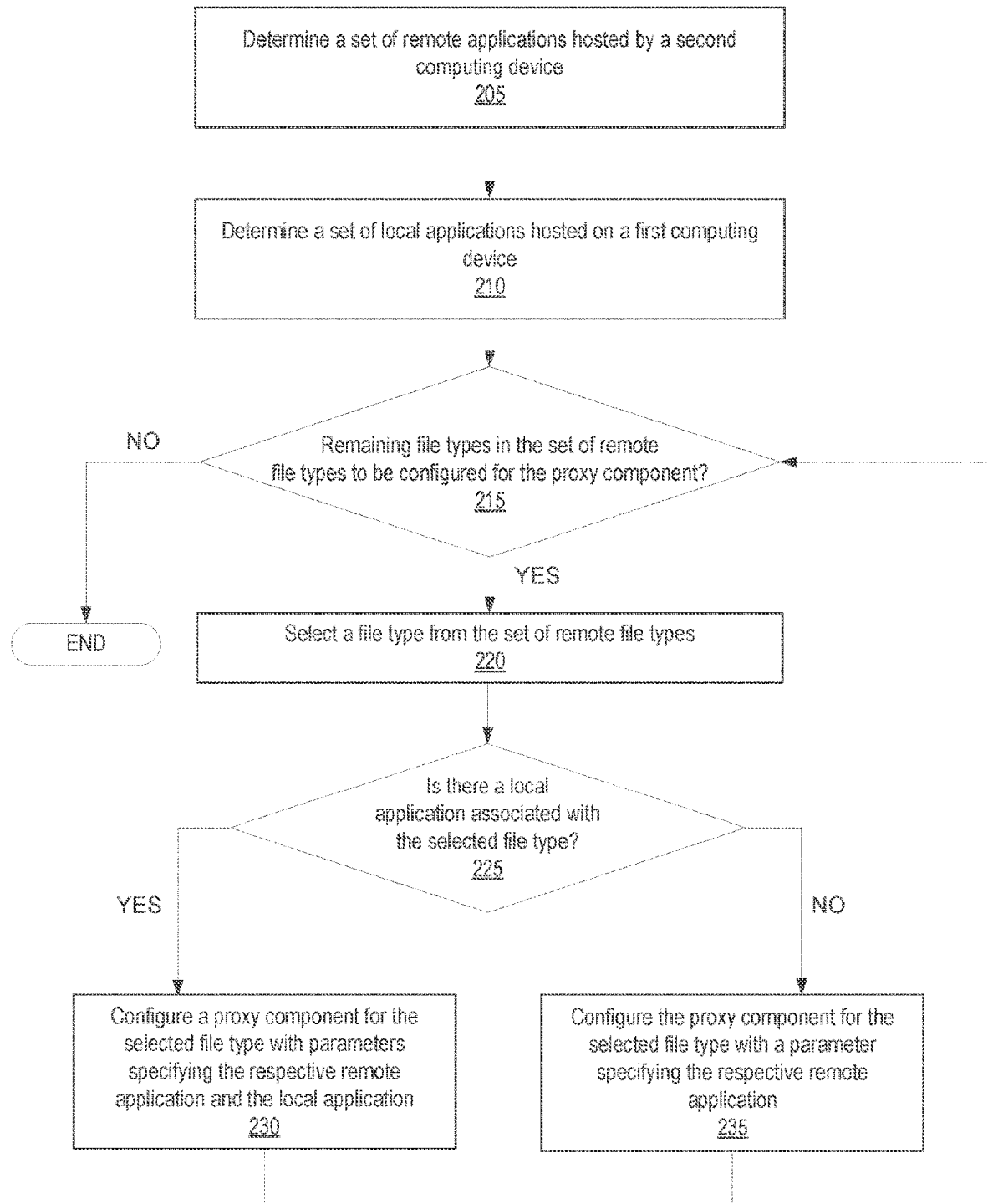
FIG. 2 depicts a flow diagram of one illustrative example of a method for configuring a proxy component for a file type with parameters specifying a remote application and a local application within the client-server environment, in accordance with one or more implementations of the present disclosure.

FIG. 2 depicts a flow diagram of one illustrative example of method 200 of configuring a proxy component for a file type with parameters specifying a remote application and a local application within the client-server environment. Method 200 and/or each of its individual functions, routines, subroutines, or operations may be performed by one or more processing units of either the client device 110 or the remote host 150 implementing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 205, processing logic may determine a set of remote applications hosted by a second computing device. In an implementation, processing logic may be implemented by a processor on a first computing device (client device 110) and the second computing device may represent the remote host 150. Prior to determining the set of remote applications 180 hosted by the remote host 150 (second computing device), the client device 110 may establish a connection between the client device 110 and the remote host 150. Establishing a connection may include the remote host 150 authenticating the client device 110. Authentication may be implemented by various mechanisms. For example, the remote host 150 may send a request to the client device for login ID and password information that should be provided by a user of the client device and transmitted to the remote host server 150. In other implementations, the remote host 150 may perform a more complex multi-factor authentication. In some implementations, authentication may be initiated by the client device 110. In yet other embodiments, no authentication may be needed.

Upon establishing the connection, the remote application server 170 may send a set of remote applications 180 that are hosted on the remote host 150 to the RAS client 120. The set of remote applications 180 may include metadata describing file types associated with each of the remote applications 180. The RAS client 120 may determine, from the set of remote applications 180, a set of remote file types for file types associated with at least one remote application 180. The set of remote file types may then be used to configure the proxy component 124 to receive file requests from the user of the client device 110 and route the file request to the appropriate application.

At block 210, processing logic determines a set of local applications hosted on the first computing device (client device 110). In an implementation, the RAS client 120 may query the OS shell of the client OS 130 using kernel APIs to retrieve a list of client applications 122 hosted on the client OS 130, including file type associations for each client application. The RAS client 120 may then receive the set of client applications 122 from the client OS 130. Each client application, in the set of client applications 122, may be associated with one or more file types.

In an implementation, the RAS client 120 configures, for each remote file type associated with at least one remote application 180, the proxy component 124, such that when a user requests to open a file with a file type matching a configured remote file type, the proxy component 124 receives the file request. When configuring the proxy component 124, the RAS client 120 may iteratively configure each of the remote file types of the set of remote file types determined from the set of remote applications 180. At decision block 215, processing logic determines whether there are remaining file types in the set of remote file types to be configured for the proxy component 124. If there are remaining file types in the set of remote file types to be configured for the proxy component 124, then processing logic proceeds to block 220 to select a file type from the set of remote file types. If, however, there are no remaining file types in the set of remote file types to be configured for the proxy component 124, then the method ends.

At block 220, processing logic selects a remote file type from the set of remote file types. In one example, the RAS client 120 may select a remote file type such as ".doc" from the set of remote file types. At decision block 225, processing logic determines whether the selected remote file type is also associated with a client application from the set of client applications 122. In an implementation, the RAS client 120 determines whether there is a client application from the set of client applications 122 that may be used to open the remote file type. Using the previous example, the RAS client 120 may determine whether a client application is capable of opening the ".doc" remote file type. If there exists a client application 122 that is capable of opening a file of the remote file type, then processing logic proceeds to block 230 to configure the proxy component 124 with parameters to open files of the remote file type with either the associated remote application or the client application. If however, processing logic determines that there is no client application from the set of client applications 122 capable of opening a file of the remote file type, then processing logic may proceed to block

235 to configure the proxy component 124 with parameters to open files of the remote file type with the associated remote application 180.

At block 230, processing logic configures the proxy component 124 with parameters to open a file of the remote file type using either the associated remote application 180 or the client application 122 identified at decision block 225. In an implementation, the RAS client 120 configures the proxy component 124 with parameters describing how to open a requested file having the remote file type. The parameters may specify options to open the file by either launching the associated remote application 180 within a remote session between the client device 110 and the remote host 150 provided by the RAS client 120 or by launching the client application 122 hosted on the client device 110. The proxy component 124 may include processing logic to determine whether to launch the associated remote application 180 or the client application 122 based upon performance metrics describing the current network state between the client device 110 and the remote host 150. Upon configuring the proxy component 124, the RAS client 120 may communicate with the client OS 130 to associate the remote file type to the proxy component 124. For example, the RAS client 120 may use OS shell APIs change the application association for files of the remote file type to open using the proxy component 124. The proxy component 124 may be recognized by the client OS 130 as an application configured to open files of the remote file type. For example, when a user opens a file having a file type matching the remote file type the client OS 130 launches the proxy component 124. The proxy component 124 then determines whether to open the file using a client application 122 or a remote application 180 within the remote session.

Referring to decision block 225, if the RAS client 120 determines that there is no corresponding client application available on the client device 110 compatible to open files of the remote file type, then the RAS client 120 configures the proxy component 124 with parameters to open the file using the corresponding remote application 180. Block 235 depicts processing logic configuring the proxy component 124 with parameters to open files of the remote file type using the associated remote application 180. In an implementation, the RAS client 120 may configure the proxy component 124 with parameters that launch the associated remote application 180 within a remote session for a requested file having the remote file type.

According to alternative aspects of the disclosure, the operations of method 200 may be performed by remote host 150. In an implementation, remote host 150 may configure the proxy component 174 to determine whether to open a requested file using either remote applications 180 hosted on the remote host 150 or client applications 122 hosted on the client device 110. The remote application server 170 may re-associate remote file types such that when a file request, within the remote session is received, the proxy component 174 is launched to determine whether it is more efficient to open the requested file using a remote application 180 or a client application 122.

Referring to FIG. 2, at block 205 the remote application server 170 may determine a set of remote applications hosted by the client device 110. For example, after a connection between the client device 110 and the remote host 150 has been established, the remote application server 170 may receive from the client device 110 a list of client applications 122, including associated file types for each of the client applications 122. In this example, the client device 110 is the remote server and the set of client applications 122 may be considered the set of remote applications as they are hosted remotely on the client device 110. The remote application server 170 may then determine a set of remote file types (client file types associated with client applications) from the set of client applications 122.

At block 210, the remote application server 170 may determine a set of local applications (applications hosted on the remote host 150) by using OS shell APIs to query the host OS 190. The remote application server 170 may receive a list of local applications that are hosted and runnable within the virtual execution environment 160.

At decision block 215, the remote application server 170 may determine whether the client file types have been configured for the proxy component 174. If there are client file types to be configured, then the remote application server 170 proceeds to block 220 to select a client file type to be configured on the proxy component 174. At decision block 225, the remote application server 170 determines whether the client file type can also be associated with a remote application 180 that is hosted on the remote host 150. If a remote application 180 capable of opening the client file type exists, then the remote application server 170 proceeds to block 230 to configure the proxy component 174 with parameters specifying both the associated client application 122 and the remote application 180 for launching files of that client file type. If however, there is no corresponding remote application 180 for the client file type, then the remote application server 170 configured the proxy component 174 with parameters to open a file of the client file type using the associated client application 122.

Both proxy component 124 and 174 are treated as applications by the client OS 130 and the remote application server 170. Proxy components 124 and 174 each contain processing logic configured to determine whether to launch a corresponding remote application or client application based upon the current client/server environment state and data proximity of the requested file. In an implementation, proxy components 124 and 174 each have logic configured to call the environment analyzer 126 and 176 respectively, to determine the current client/server environment state and data proximity. Upon determining the client/server environment state, proxy components 124 and 174 determine performance values associated with the corresponding remote application 180 and the client application 122 in order to determine which application is best suited to open the requested file based upon the current client/server environment.

In an implementation, proxy component 124 may receive a request to open a file of a particular file type. For example, a user of the client device 110 may initiate a request to open a file by navigating to a local file viewer application, such as Windows Explorer of Mac Finder, within the client OS 130. The user may select the file to open by, for example, double clicking on the file. The client OS 130 may receive the request to open the file and may determine, based upon file type associations, that the requested file is associated with the proxy component 124. The client OS 130 may then cause the proxy component 124 to receive the request to open the file and the proxy component 124 may then determine and cause the file to be opened with either a local client application 122 or with a remote application 180.

Similar to the proxy component 124, the proxy component 174, on the remote host 150, may receive a request to open a file of a particular file type. For example, the user of client device 124 may be interacting with the remote host 150, within a remote session between the client device 110 and the remote host 150, provided by the RAS client 120.

During the remote session, the user may initiate a request to open a file by navigating to a file viewer application provided by the remote application server 170. The remote application server 170 may receive the request to open the file and may determine, based on file type associations, that the requested file is associated with the proxy component 174. The remote application server 170 may then cause the proxy component 174 to receive the request to open the file.

Figure 3:
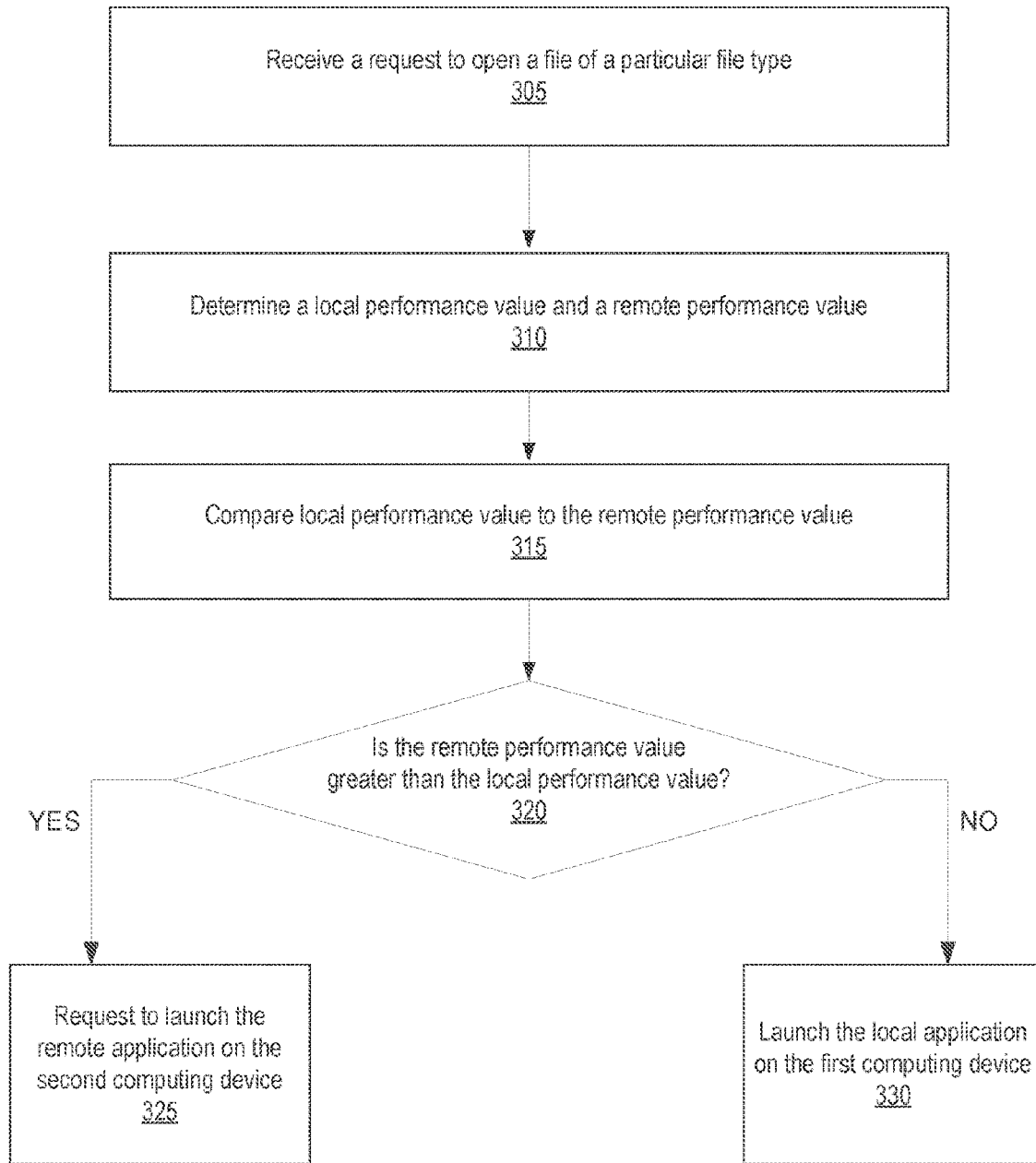
FIG. 3 depicts a flow diagram of one illustrative example of a method of receiving a file request and determining whether to open the file using either a local application or a remote application, in accordance with one or more implementations of the present disclosure.

FIG. 3 depicts a flow diagram of one illustrative example of method 300 of receiving a file request and determining whether to open the file using either an application local to the client device 110 or a remote application. Method 300 and/or each of its individual functions, routines, subroutines, or operations may be performed by one or more processing units of either the client device 110 or the remote host 150 implementing the method.

At block 305, processing logic receives a request to open a file of a particular file type. For example, the proxy component 124 on the client device 110 may receive a request to open a file of a particular file type that has been associated with the proxy component 124. In another example, the proxy component 174 on the remote host 150 may receive a request to open a file, where the request was initiated by the user of the client device 110 within a remote session provided by the RAS client 120.

At block 310, processing logic determines a local application performance value and a remote application performance value. The local application performance value indicates performance efficiency for opening the file within using local application, such as client application 122. The remote application performance value indicates performance efficiency for opening the file with a remote application, such as remote application 180. In an implementation, the proxy component 124 may determine a local performance value and a remote performance value by calling the environment analyzer 126 to determine performance values for using a local application (client application 122) on the client device 110 and for using remote application 180 on the remote host 150. Performance values may be determined by evaluating the client/server environment state and the storage location of the requested file.

In an implementation, the environment analyzer 126 on the client device 110 may gather network connection metrics by evaluating the network connection between the client device 110 and the remote host 150. In one example, the environment analyzer 126 may determine whether the network connection between the client device 110 and the remote host 150 is available by pinging the remote host 150. The environment analyzer 126 may determine network latency using the ping based on the round-trip time of a packet from the client device 110 to the remote host 150 and back to the client device 110. Additionally, the environment analyzer 126 may test the network connection speed by determining the speed of data transfer between the client device 110 and the remote host 150.

In an implementation, testing current network connectivity and network speed may cause the environment analyzer 126 to check the state of the network on-demand, such as for example checking the state of the network in response to each request to open a file. In other implementations, the environment analyzer 126 may be configured to periodically check the network state between the client device 110 and the remote host 150. By periodically checking the network state, the environment analyzer 126 may be able to pre-check aspects of the client/server environment in order to save processing time for each file request when determining the network state.

In an implementation, the environment analyzer 126 may determine the proximity of the requested file with respect to the client device 110 and the remote host 150. The location of the requested file may factor into determining the performance efficiency of both the client application 122 and the remote application 180. For example, if the requested file is located on the client device 110, then the environment analyzer 126 may take into account time to copy the requested file from the client device 110 to the remote host 150 when determining the application performance value for the remote application 180. Similarly, if the requested file is located on the remote host 150, then the environment analyzer 126 may take into account time to copy the requested file from the remote host 150 to the client device 110 when determining the application performance value for the client application 122. Proximity of the requested file may be referred to as synchronization time. The synchronization time may include time to copy the entire file from the either client device 110 to the remote host 150 or time to synchronize parts of the file, such as if the remote host 150 contains an older version of the file and only select chunks of the file need to be copied from the client device 110 to the remote host 150 in order to synchronize the requested file for use on the remote host 150.

In an implementation, the requested file may be located on another client device, another remote host, or in cloud storage 142. The environment analyzer 126 may take into account synchronization time for copying all or parts of the requested file from another client device, another remote host, or from cloud storage 142 when determining each of the local application performance value and remote application performance value. For example, if the file is located in cloud storage 142, then the environment analyzer 126 may determine file proximity for the local application 122 as the time it takes to copy the requested file from cloud storage 142 to the client device 110. Similarly, the environment analyzer 126 may determine file proximity for the remote application 180 as the time is takes to copy the requested file from cloud storage 142 to the remote host 150.

Upon determining the client/server environment state and the file proximity of the requested file, the environment analyzer 126 may calculate the local application performance value and the remote application performance value for the client application 122 on the client device 110 and the remote application 180 on the remote host 150 respectively. The values assigned to the local application performance value and the remote application performance value may represent an aggregated numerical value based on weights given to measured metrics such as network availability, latency, speed, and synchronization time needed for the requested file. At block 315, processing logic may compare the local application performance value to the remote application performance value to determine whether to open the requested file using the client application 122 or the remote application 180.

At decision block 320, processing logic may determine whether the remote application performance value is greater than the local application performance value. In an implementation, the environment analyzer 126 may determine whether it is more efficient to use the associated remote application 180 or the associated client application 122 based on the remote application performance value and the local application performance value. The environment analyzer 126 may send to the proxy component 124 a recommendation as to whether it is more efficient to open the file using either the remote application 180 or the client application 122 based upon the comparison of the remote application performance value and the local application performance value.

If at decision block 320 processing logic determines that the remote application performance value is greater than the local application performance value then processing logic proceeds to block 325 to request to launch the remote application 180 for opening the requested file. In an implementation, the proxy component 124 may receive the recommendation from the environment analyzer 126 stating that the remote application should be launched based on the remote application performance value being greater than the local application performance value. The proxy component 124 may send a request to launch the remote application 180 to the RAS client 120. Since remote applications 180, hosted on the remote host 150, are accessible to the client device 110 via the RAS client 120, the RAS client 120 may receive the request to launch the remote application 180 from the proxy component 124 and may cause the remote application 180 to be launched with execution parameters specifying the requested file. If the requested file is located on the client device 110 or a location other than the remote host 150, then the proxy component 124 may first cause the requested file to be synchronized on the remote host 150 by copying either the entire file or portions of the file to the remote host 150. In another example, the proxy component 124 may specify additional launch parameters to the remote application 180, such that the remote application 180 performs the file synchronization prior to opening the file within the remote application 180.

If at decision block 320 processing logic determines that the local application performance value is greater than the remote application performance value then processing logic proceeds to block 330 to launch the client application 122 to open the requested file. In an implementation, the proxy component 124 may receive a recommendation from the environment analyzer 126 stating that the client application 122 should be launched based on the local application performance value being greater than the remote application performance value. The proxy component 124 may then cause the client application 122 to be launched and may specify execution parameters to include the requested file for the client application 122. If the requested file is located on the remote host 150 or a location other than the client device 110, then the proxy component 124 may first synchronize the requested file to the client device 110 prior to opening the file within the remote application.

As described, method 300 may be performed by the proxy component 174 on the remote host 150. If during a remote session, between the client device 110 and the remote host 150, the user initiates a request to open a file then the proxy component 174 may receive the request to open the file (block 305). The proxy component 174 may determine a local performance value and a remote performance value by calling the environment analyzer 176 to determine performance values for using a local application (remote application 180) on the remote host 150 and for using client application 122 on the client device 110 (block 310). The environment analyzer 176 may compare the local application performance value to the remote application performance value to determine whether to open the requested file using the client application 122 or the remote application 180 (block 315). The environment analyzer 176 may then determine whether the remote application performance value is greater than the local application performance value (decision block 320). In this scenario, the remote application performance value refers to opening the file using the client application 122 because the client application is located on the device (client device 110) that is remote to the local device (remote host 150). The local application performance value refers to opening the file using the remote application 180, as the remote application 180 is the local application for the remote host 150. If it is determined that the remote application performance value is greater than the local application performance value then the proxy component 174 may send a request to launch the client application 122 to the RAS client 120 (block 325). If however, it is determined that the local application performance value is greater than the remote application performance value then the proxy component 174 may launch the remote application 180, which the user on client device 110 may interact with using the RAS client 120 (block 330).

File sharing and collaboration of files between user devices within the client/server environment may be enhanced using the described client-host computing system 100. Conventionally, sharing files between client devices includes storing a master copy of the shared file on a central server repository or cloud storage environment. However, storing the master copy of a shared file on a central server generally requires network resources to make a copy of the shared file and transfer the file to the relevant destination for viewing and/or modification. Aspects of the present disclosure describe maintaining the master copy of the shared file at the location where the file was created and synchronizing the shared file when necessary. For example, if the shared file is maintained on the client device 110, then the shared file may only need to be copied to the remote host 150 when the shared file is opened using remote application 180 hosted on the remote host 150.

In an implementation, the user of the client device 110 may share one or more files located on the client device 120 with the remote host 150 and/or other client devices. For example, upon establishing a connection with the remote host 150, the RAS client 120 may determine the one or more files to be shared with the remote host 150. The RAS client may generate share information for the one or more files to be shared. The share information may comprise metadata describing information about the one or more files including, but not limited to, file names, file sizes, creation data, and modification date for the files to be shared. The RAS client 120 may send the share information to the remote host 150.

In an implementation, the remote host 150 may receive the share information from the RAS client 120 and may create a virtual view of the shared files. The virtual view may comprise a graphical user interface displaying the one or more shared files and the share information associated with each file. Other users, who may connect to the remote host 150 using a remote session, may be able to view the virtual view of shared files and may select a file to be opened using either a remote application hosted by the remote host 150 or a local application hosted by the client device of the other user.

Figure 4A:
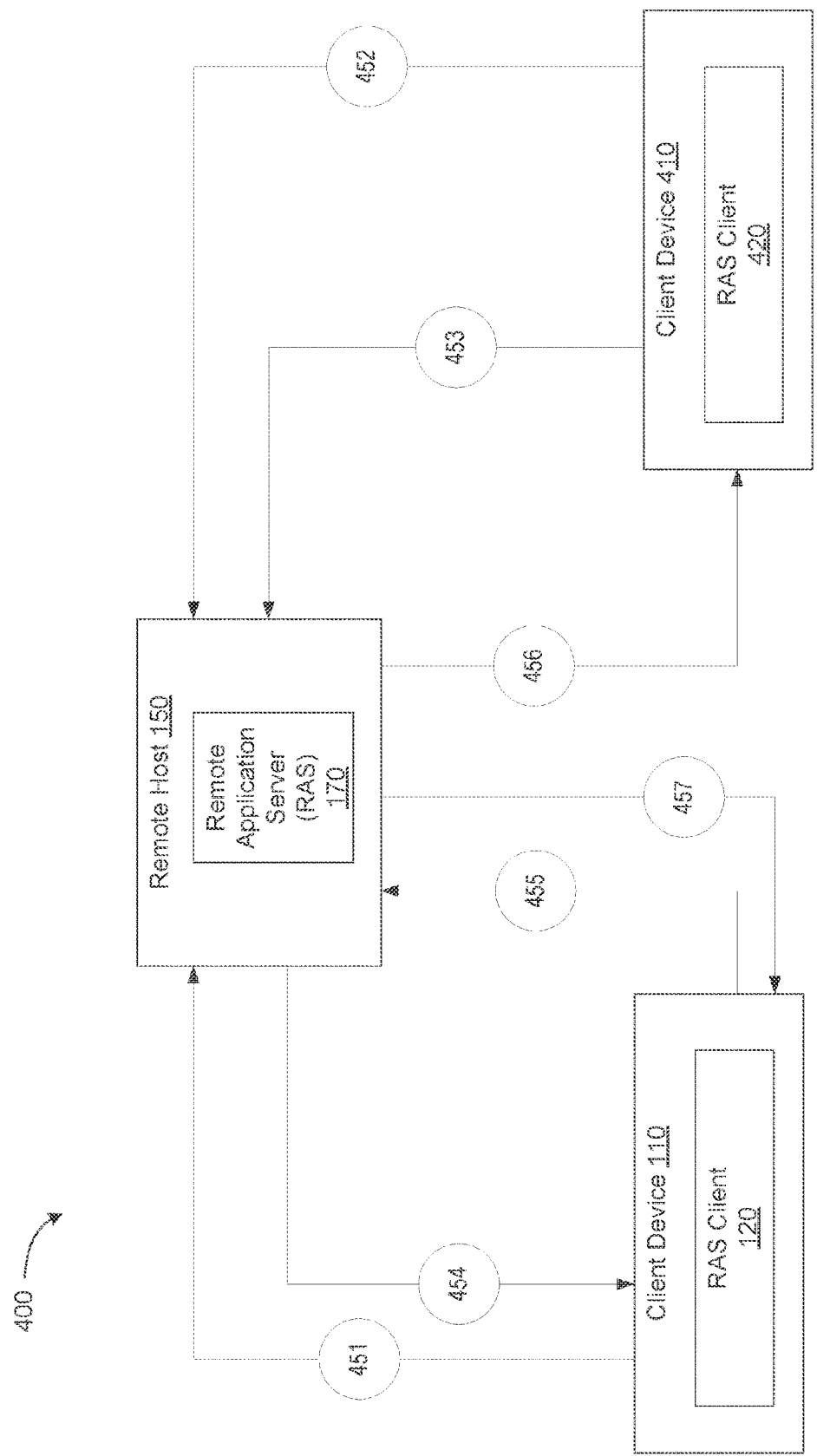
FIG. 4A is a block diagram illustrating a client-host computing system with a client device requesting to open a shared file that has been shared by another client device using a remote application on a remote host, in accordance with one or more implementations of the present disclosure.

FIG. 4A is a block diagram illustrating a client-host computing system with a client device requesting to open a shared file that has been shared by another client device using a remote application on a remote host, in accordance with one or more implementations of the present disclosure. FIG. 4A includes reference numbers depicting interactions between devices. Client-host computing system 400 comprises client devices 110 and 410 and remote host 150. In an implementation, client device 110 may establish a connection with remote host 150. Upon establishing the connection, the RAS client 120 may send share information, including metadata for shared files, to the remote host 150 (reference 451). The remote host 150 may receive the share information and use the metadata to generate a virtual view of the shared files. Client device 410 may establish a connection with remote host 150. Client device 410 may comprise RAS client 420, which may also send share information comprising files shared by the user of client device 410 to the remote host 150 (reference 452).

In an implementation, within the remote session between the client device 410 and remote host 150, the remote application server 170 may display virtual view of shared files from other users, including the shared files from client device 110. The user of client device 410 may select a shared file to open (reference 453). Upon receiving, the request to open a shared file, the remote application server 170 may call the proxy component 176 to determine whether to open the file using a remote application on the remote host 150 or to open the file using a local application hosted on the client device 410. As described previously in blocks 310-320, the proxy component 174 and the environment analyzer 176 may determine application performance values for executing an application on the remote host 150 and on the client device 410. Upon determining where to launch an application for opening the requested shared file, the remote application server 170 may request the contents of the shared file from the client device 110 (reference 454). Alternatively, the remote host 150 may request the contents of the shared file prior to determining where to launch an associated application from the shared file. The RAS client 120 may then send contents of the shared file to the remote application server 170 (reference 455). Upon receiving the contents of the shared file, the remote application server 170 may launch the remote application and may present the remote application with the opened shared file via the RAS client 420 on the client device 410 (reference 456). The user of the client device 410 may update the shared file within the remote session using the launched remote application. When the user is finished updating the shared file, the user may close the shared file and/or the remote application. Upon closing the shared file, the remote application server 170 may synchronize the changes made to the copy of the shared file stored on the remote host 150 to the master copy of the shared file stored on the client device 110 (reference 457). By doing so, the remote host 150 is able to ensure that the shared file on the client device 110 (master copy) contains the latest updates.

Figure 4B:
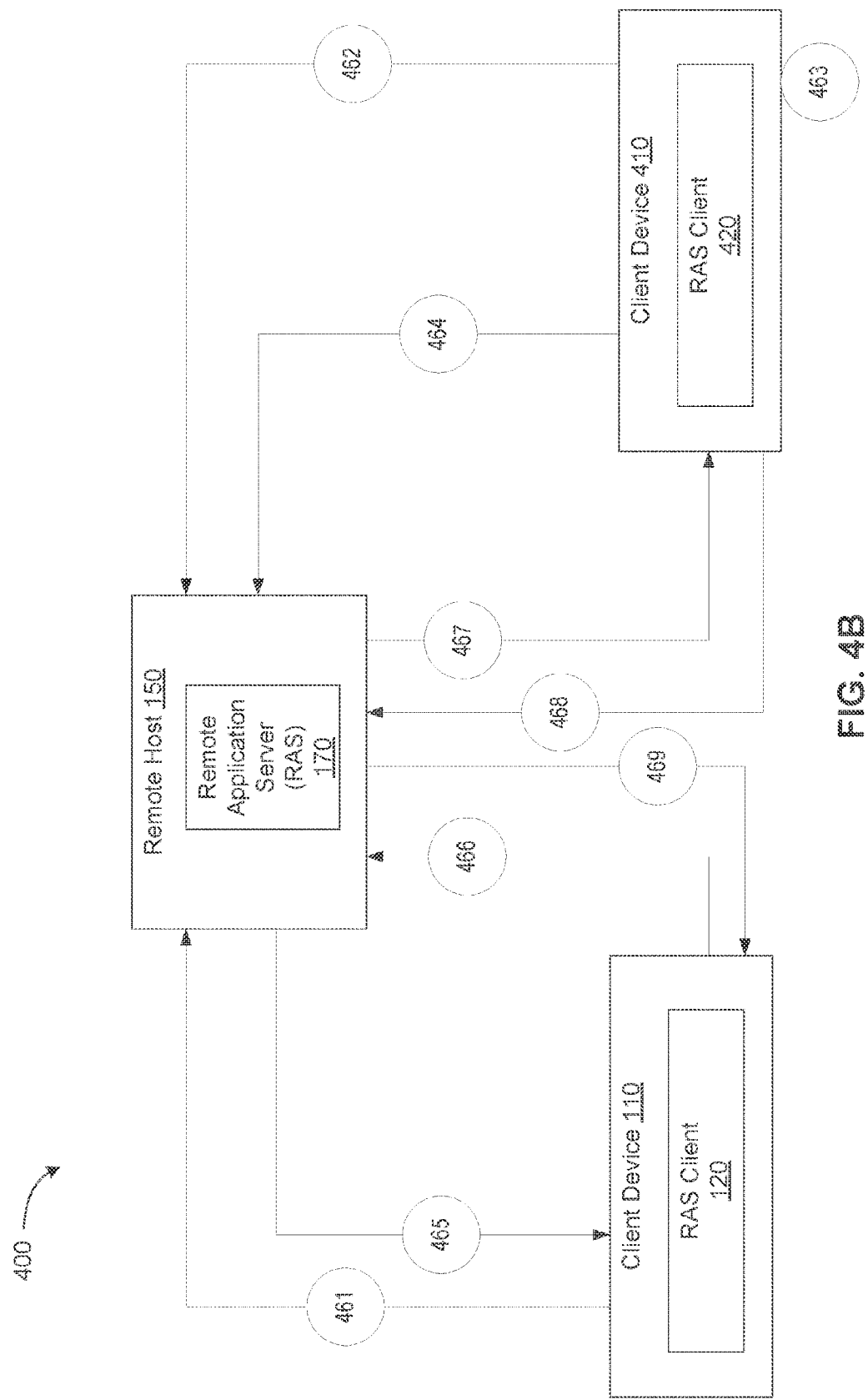
FIG. 4B is a block diagram illustrating the client-host computing system with the client device requesting to open a shared file that has been shared by another client device using a local application on the client device, in accordance with one or more implementations of the present disclosure.

In an alternative example, the client device 410 may open the shared file within a local application hosted by the client device 410. FIG. 4B is a block diagram illustrating the client-host computing system with the client device requesting to open a shared file that has been shared by another client device using a local application on the client device, in accordance with one or more implementations of the present disclosure. Similar to the example described in FIG. 4A, client device 110 may establish a connection with remote host 150 and then the RAS client 120 may send share information to the remote host 150 (reference 461). Client device 410 may also establish a connection with remote host 150 and may send share information to the remote host 150 (reference 462). The remote application server 170 may send share information to the client device 410 in order to display the virtual view of shared files. The virtual view may be visible within a remote session established between the RAS client 420 and the remote application server 170. Alternatively, the virtual view of shared files may also be displayed within a native file viewer application hosted on the client device 410. Examples of a native file viewer application include, but are not limited to, Microsoft Windows or Mac Finder.

In an implementation, the user of the client device 410 may select, within a native file viewer application, the shared file to open (reference 463). Upon selecting the shared file, a proxy component and an environment analyzer on the client device 410 may determine whether to open the shared file using a remote application hosted on the remote host 150 or a local application hosted on the client device 410. If the proxy component determines to launch the local application hosted by the client device 410, the RAS client 420 may request the content of the shared file in order to open the shared file using the local application (reference 464). The remote application server 170 may receive the request for the contents of the shared file from the RAS client 420 and may forward the request to the client device 110, where the master copy of the shared file is stored (reference 465). Upon receiving the request, the RAS client 120 on the client device 110 may send the content of the shared file to the remote host 150 (reference 466). The remote application server 170 may receive the contents of the shared file and send the contents to the client device 410 (reference 467). The RAS client 420 may receive the contents of the shared file and may store the contents of the shared file on the client device 410. The client device 410 may then launch the local application to open the shared file for the user. The user may edit the shared file and then may save the changes to the shared file stored locally. Upon saving the changes and/or closing the local application, the RAS client 420 may send the changes to the shared file to the remote host 150 in order to synchronize the changes to the master copy of the shared file stored on the client device 110 (reference 468). The remote application server 170 may receive the changes to the shared file and may forward the changes to the client device 110 (reference 469). The RAS client 120 on the client device 110 may receive the changes and may apply the changes to the shared file (master copy).

Examples described using FIGS. 4A and 4B describe scenarios for maintaining a master copy of the shared file on a client device such that the content of the shared file are synchronized to other device when it is necessary. In another implementation, the shared file may be synchronized via direct communication between client devices in order to reduce additional file content data transfer via remote hosts. If both client devices are connected to the same network, then the client devices may establish direct communication with each other in order to transfer contents of the shared file between client devices.

Figure 4C:
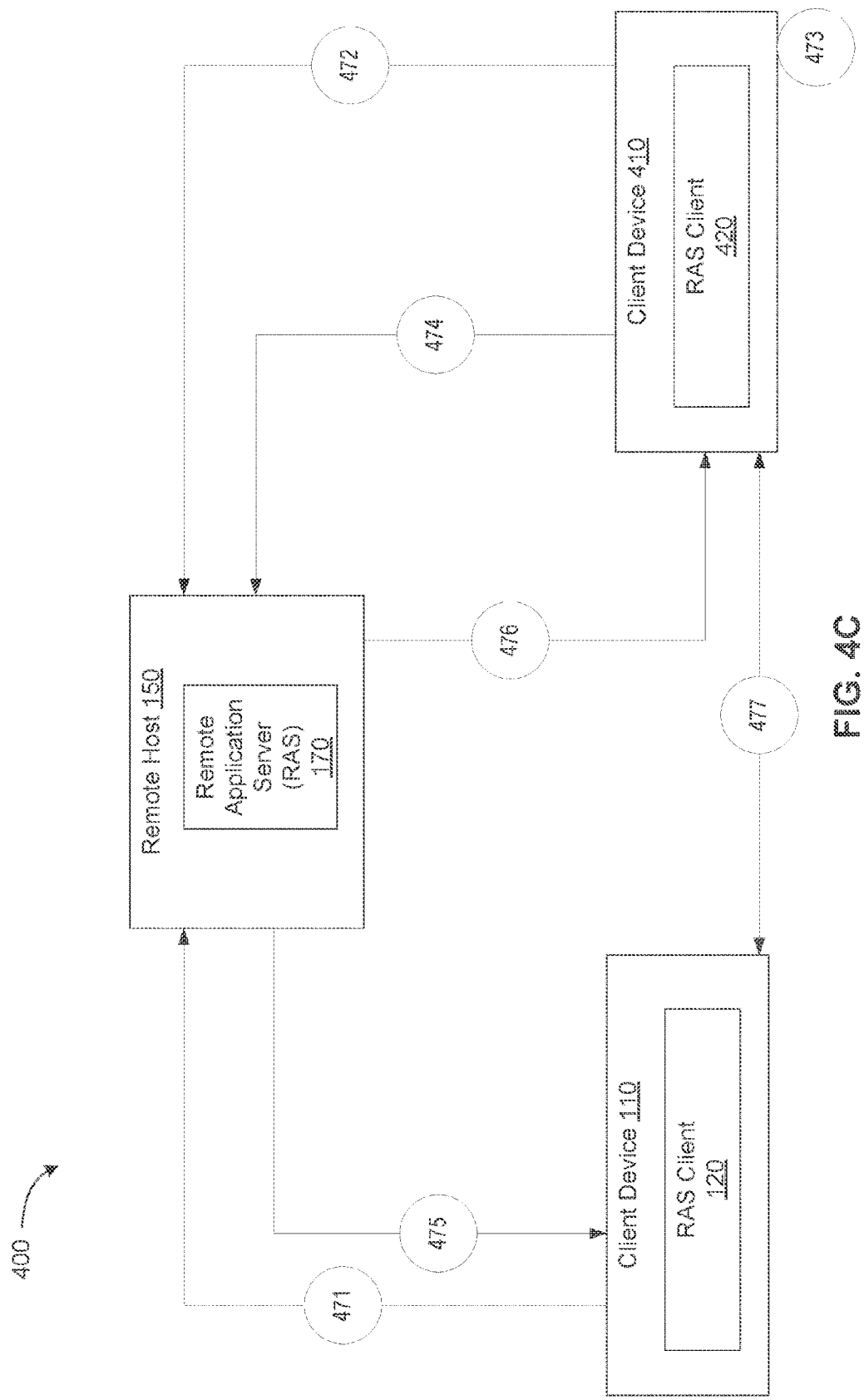
FIG. 4C is a block diagram illustrating the client-host computing system with the client device requesting to open a shared file that has been shared by another client device and receiving the contents of the shared file directly from the other client device, in accordance with one or more implementations of the present disclosure.

FIG. 4C is a block diagram illustrating the client-host computing system with the client device requesting to open a shared file that has been shared by another client device and receiving the contents of the shared file directly from the other client device, in accordance with one or more implementations of the present disclosure. Similar to the example described in FIG. 4A, client device 110 may establish a connection with remote host 150 and then the RAS client 120 may send share information to the remote host 150 (reference 471). Client device 410 may also establish a connection with remote host 150 and may send share information to the remote host 150 (reference 472). The remote application server 170 may send share information to the client device 410 in order to display the virtual view of shared files.

In an implementation, the user of the client device 410 may select, within a native file viewer application, the shared file to open (reference 473). Upon selecting the shared file, a proxy component and an environment analyzer on the client device 410 may determine to open the shared file using a local application hosted on the client device 410. The RAS client 420 may request the content of the shared file in order to open the shared file using the local application (reference 474). The remote application server 170 may receive the request for the contents of the shared file and may be configured to determine whether both client device 110 and client device 410 are on the same network using conventional network tools and/or resources. If the remote application server 170 determines that both client device 110 and client device 410 are on the same network, then the remote application server 170 may notify the client device 110 of the request for the shared file and may request a peer-to-peer session between the requesting client device 410 and client device 110 in order to transfer the contents of the shared file (reference 475).

The client device 110 may receive the request and may determine whether to accept or deny the request for a peer-to-peer session between the client device 110 and client device 410. The RAS client 120 may respond to the remote host 150 by denying the peer-to-peer request, which may then cause transfer of the contents of the shared file via the remote host 150 (as described in FIG. 4B). Alternatively, the RAS client 120 may accept the peer-to-peer request and may respond to the remote host 150 by sending authentication credentials for generating the peer-to-peer session to the remote host 150. The remote host 150 may then reply to the client device 410 by sending a successful acknowledgment that includes the authentication credentials for establishing a peer-to-peer session with client device 110 (reference 466). Upon receiving the successful acknowledgment, the RAS client 420 may establish the peer-to-peer session with the RAS client 120 on the client device 110 (reference 467). The contents of the shared file may then be directly transferred to the client device 410 in order to open the shared file using the local application hosted on the client device 410. The peer-to-peer session may remain open while the shared file is edited and upon saving the shared file on the client device 410, the RAS client 420 may synchronize the changes to the shared file to the client device 110 using the existing peer-to-peer session. In another example, the peer-to-peer session may end upon the initial transfer of contents of the shared file from the client device 110 to the client device 410. Another peer-to-peer session may be established prior to synchronizing changes to the shared file back to the client device 110.

Figure 5:
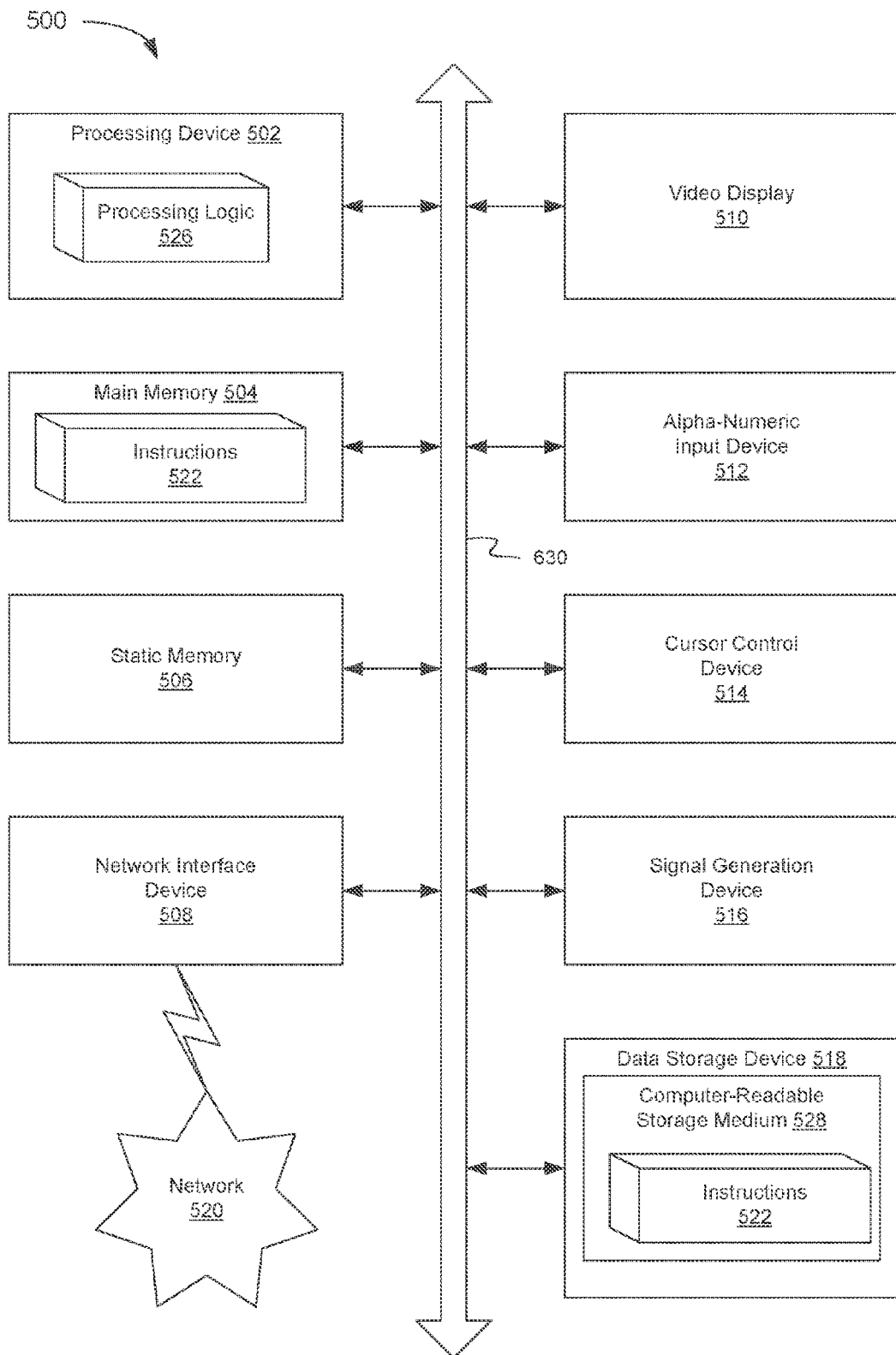
FIG. 5 depicts a block diagram of an example computer system operating in accordance with one or more aspects of the present disclosure.

FIG. 5 schematically illustrates a component diagram of an example computer system 500 which may perform any one or more of the methods described herein. In various illustrative examples, computer system 500 may represent the remote host 150 and/or client device 110 of FIG. 1.

Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may comprise a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of initiating application execution in a client-server virtual execution environment, and/or method 500 of delivering application containers to the client device, and/or method 600 of periodic monitoring of remote server's performance.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or more specifically a non-transitory computer-readable storage medium) 528 on which is stored one or more sets of executable instructions 522. In accordance with one or more aspects of the present disclosure, executable instructions 522 may comprise executable instructions implement method 400 of initiating application execution in a client-server virtual execution environment, and/or method 500 of delivering application containers to the client device, and/or method 600 of periodic monitoring of remote server's performance.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    establishing upon a first client device a request to open a file associated with a particular file type stored upon a storage device accessible to a second client device in dependence upon a user selection with respect to a virtual view of shared files stored upon the second client device provided to the first client device by a remote application server (RAS) client in execution upon a RAS which is communication with both the first client device and second client device where the file is one of the shared files;
    dynamically determining whether to open the file of the particular file type with a local application associated with the particular file type upon the first client device or a remote application associated with the particular file type upon the remote host;
    opening the file with the determined one of the local application and the remote application;
    upon determining to open the file with the local application determining, with the RAS, whether the first client device and the second client device are on the same network;
    upon a positive determination that the first client device and the second client device are on the same network notifying, by the RAS, the second client device of the request to open the file and requesting, by the RAS, a peer-to-peer session between the first client device and second client device in order to transfer the contents of the file;
    determining whether the second client device denies or accepts the request for the peer-to-peer session;
    upon determining that the second client device has denied the request for the peer-to-peer session transferring the file from the storage device accessible to the second client device to the first client device via the RAS;
    upon determining that the client device has accepted the request for the peer-to-peer session establishing via the RAS the peer-to-peer session between the first client device and the second client device so that the file can be directly transferred from the storage device accessible to the second client device to the first client device.

2. The method according to claim 1, wherein
    the dynamic determination is established by an environment analyzer coupled to a network to which at least the first client device and the RAS are connected;
    the environment analyzer collects data relating to network bandwidth, network noise, and network quality and establishes the determination in dependence upon the collected data.

3. The method according to claim 1, wherein
    the dynamic determination is established by an environment analyzer coupled to a network to which the first client device, the RAS and the second client device are connected;

the environment analyzer collects data relating to network bandwidth, network noise, and network quality and establishes the determination in dependence upon the collected data.

4. The method according to claim 1, further comprising keeping the peer-to-peer session open whilst a user edits the file within the local application;
saving the edited file upon the first client device; and
synchronizing, with the RAS client, the saved edited file on the first client device with the original file on the second client device using the existing peer-to-peer session.

5. The method according to claim 1, further comprising terminating the peer-to-peer session after transfer of the file from the second client device to the first client device;
saving the edited file upon the first client device; and
synchronizing the saved edited file on the first client device with the original file on the second client device using another peer-to-peer session established between the first client device and the second client device by the RAS client.

6. The method according to claim 1, wherein
the dynamic determination is established by an environment analyzer coupled to a network to which at least the first client device and the RAS are connected;
the environment analyzer collects data relating to network bandwidth, network noise, and network quality and establishes the determination in dependence upon the collected data.

7. The method according to claim 1, wherein
the dynamic determination is established by an environment analyzer coupled to a network to which the first client device, the RAS and the second client device are connected;
the environment analyzer collects data relating to network bandwidth, network noise, and network quality and establishes the determination in dependence upon the collected data.

8. A method comprising:
establishing upon a first computing device a request to open a file associated with a particular file type stored upon a storage device accessible to the first computing device;
determining whether to open the file of the particular file type with a local application associated with the particular file type upon the first computing device or a remote application associated with the particular file type upon a second computing device; and
opening the file with the determined one of the local application and the remote application; wherein
the determination is established by an environment analyzer coupled to a network to which the first computing device and the second computing device are connected which:
collects data relating to performance of the network;
calculates performance values for each scenario of a set of scenarios in dependence upon a local application performance value associated with opening the requested file of the particular file type with the local application and a remote application performance value associated with opening the requested file of the particular file type; and
establishes the determination in dependence upon the calculated different performance values for the set of scenarios and selects a scenario of the set of scenarios with the highest performance value.

9. The method according to claim 8, wherein
a first scenario of the set of scenarios comprises synchronizing the requested file of the particular file type by copying the entire requested file of the particular file type; and
a second scenario of the set of scenarios comprises synchronizing the requested file of the particular file type based upon only synchronizing those portions of the requested file of the particular file type that need synchronization.

10. The method according to claim 8, wherein
the determination is dynamically determined upon the request to open the file being established.

11. A method comprising:
establishing upon a first client device a request to open a file associated with a particular file type stored upon a storage device accessible to a second client device in dependence upon a user selection with respect to a virtual view of shared files stored upon the second client device provided to the first client device by a remote application server (RAS) client in execution upon a RAS which is communication with both the first client device and second client device where the file is one of the shared files;
dynamically determining whether to open the file of the particular file type with a local application associated with the particular file type upon the first client device or a remote application associated with the particular file type upon the remote host; and
opening the file with the determined one of the local application and the remote application; wherein
the determination is established by an environment analyzer coupled to a network to which the first computing device and the second computing device are connected which:
collects data relating to performance of the network;
calculates performance values for each scenario of a set of scenarios in dependence upon a local application performance value associated with opening the requested file of the particular file type with the local application and a remote application performance value associated with opening the requested file of the particular file type; and
establishes the determination in dependence upon the calculated different performance values for the set of scenarios and selects a scenario of the set of scenarios with the highest performance value.

12. The method according to claim 11, wherein
a first scenario of the set of scenarios comprises synchronizing the requested file of the particular file type by copying the entire requested file of the particular file type; and
a second scenario of the set of scenarios comprises synchronizing the requested file of the particular file type based upon only synchronizing those portions of the requested file of the particular file type that need synchronization.

13. The method according to claim 11, wherein
the determination is dynamically determined upon the request to open the file being established.

* * * * *